Figure 1:
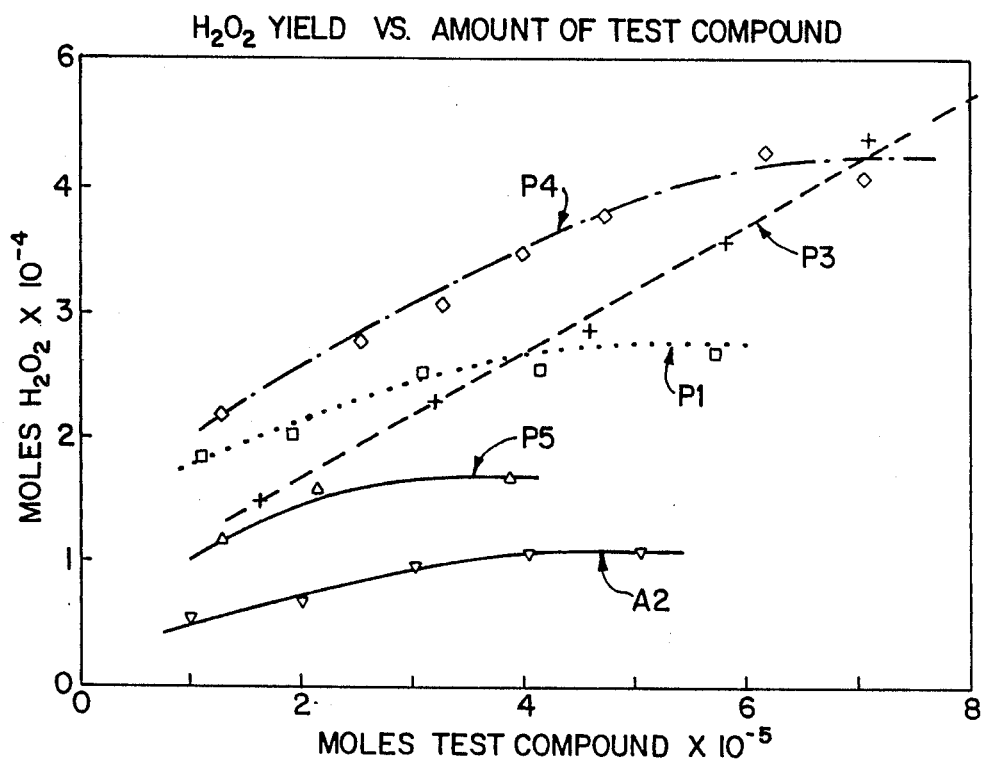

United States Patent [19]

Stevens et al.

[11] Patent Number: 4,946,566
[45] Date of Patent: Aug. 7, 1990

[54] PHOTOCHEMICAL PRODUCTION OF HYDROGEN PEROXIDE

[75] Inventors: R. D. Samuel Stevens, Thornhill; Stephen R. Cater; Clarke E. Slemon, both of Willowdale, all of Canada

[73] Assignee: Canadian Patents & Development Ltd., Ottawa, Canada

[21] Appl. No.: 402,463

[22] Filed: Sep. 5, 1989

[30] Foreign Application Priority Data

Oct. 3, 1988 [CA] Canada .................................. 579701

[51] Int. Cl.$^5$ ............................................. B01J 19/12
[52] U.S. Cl. ................................................. 204/157.5
[58] Field of Search ........................ 204/157.5, 157.52

[56] References Cited

U.S. PATENT DOCUMENTS 4,576,687  3/1986  Hertl et al. ...................... 204/157.5

Primary Examiner—Robert L. Stoll
Assistant Examiner—Wayne A. Lange
Attorney, Agent, or Firm—Juliusz Szereszewski

[57] ABSTRACT

The present invention relates to a photochemical process for the manufacture of hydrogen peroxide
wherein a 9,10-phenanthraquinone compound is exposed, in the presence of an effective amount of a hydrogen donor alcohol, to electromagnetic radiation to photoreduce the 9,10-phenanthraquinone compound to the corresponding dihydro-compound,
wherein the dihydro-compound obtained is oxidized to produce hydrogen peroxide and to regenerate the 9,10-phenanthraquinone compound, and characterized in that said 9,10-phenanthraquinone compound is selected from the group of compounds consisting of unsubstituted 9,10-phenanthraquinone and 9,10-phenanthraquinone substituted by one or more members of the class consisting of alkyl groups of 1 to 8 carbon atoms, —$CF_3$, F and —$SO_3M$, M being H or an alkali metal.

23 Claims, 1 Drawing Sheet

PHOTOCHEMICAL PRODUCTION OF HYDROGEN PEROXIDE

The present invention relates to the preparation of hydrogen peroxide ($H_2O_2$) by means of a photochemical based process which can utilize solar radiation as an energy source.

Hydrogen peroxide has a variety of uses. It is used for environmental applications, for chemical synthesis, for bleaching pulp in the Pulp and Paper industry, etc .... It has also been suggested that hydrogen peroxide be used as a fuel.

Hydrogen peroxide is presently manufactured in large, expensive, centralized plants using a cyclic autoxidation process involving the alternate reduction and oxidation of anthraquinone or a substituted anthraquinone (hereinafter, unless otherwise indicated, referred to collectively as an anthraquinone compound or compounds).

The widely used autoxidation anthraquinone processes (hereinafter referred to as AA processes) are basically variations of the Riedl-Pfleiderer process which was developed in Germany during the second World War. The AA processes generally involve a catalytic reduction of an anthraquinone compound to the corresponding dihydro-anthraquinone compound, separation of the dihydro-anthraquinone compound from the catalyst, and oxidation of the so obtained dihydro-anthraquinone compound to produce hydrogen peroxide and regenerate the anthraquinone compound. The various steps of such a process may generally be visualized as below with respect to the following equations wherein for the purpose of illustration the anthraquinone compound is shown as an alkylanthraquinone (AQ):

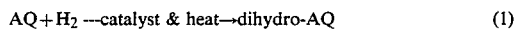
(1)

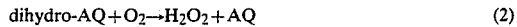
(2)

In the above equations (1) and (2):

AQ represents an alkyl-anthraquinone of formula

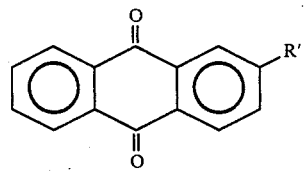

and
dihydro-AQ represents the corresponding dihydro-alkylanthraquinone of formula

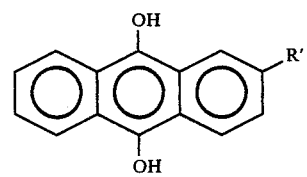

R' in either case being an alkyl group.

The AA processes have a number of disadvantages; for example:

(a) The catalytic reduction of an anthraquinone compound to the corresponding dihydro-anthraquinone compound requires a source of hydrogen (i.e. $H_2$) usually in the form of hydrogen gas. Accordingly, an $H_2O_2$ production facility which is based on the AA processes must be located near a suitable source of $H_2$. This requirement has resulted in the construction of centralized $H_2O_2$ production plants which are very large and expensive to build and operate $H_2$ is also a relatively expensive raw material when compared to other cost components involved in the production of $H_2O_2$;

(b) The catalyst for the reduction step is usually expensive, subject to deactivation and must be separated from the dihydro-anthraquinone compound before the dihydroanthraquinone compound is oxidized;

(c) The AA processes are prone to side reactions which can produce undesirable by-products (e.g. tetrahydroanthaquinones); and (d) The AA processes are endothermic. Thus there is a heating cost component involved in the production of $H_2O_2$. The reduction step is typically carried out at 50° C.

From the above, it can be seen that it would be advantageous to have a cheaper, less site-restricted supply of $H_2O_2$. More particularly, it would be beneficial to be able to have small, onsite, $H_2O_2$ production facilities; such facilities could be used to advantage by major users of $H_2O_2$ such as Pulp and Paper mills.

An alternate process route for the production of $H_2O_2$ is known. This other route involves photochemical reactions. Such process route can avoid some of the disadvantages of the AA processes.

As to the route itself, it is known that an anthraquinone compound can be photochemically reduced, in the presence of an hydrogen donor alcohol, to a corresponding dihydro-anthraquinone compound, the alcohol being oxidized to an aldehyde or ketone as the case may be (see, for example, U.S. Pat. Nos. 4,576,687; 4,525,255;and 4,609,444). For the purpose of illustration only, the overall reaction scheme for photochemical reduction may be viewed generally as in the following equation (3):

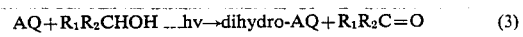
(3)

In the above equation (3)

hv is a source of electromagnetic radiation, i.e. light, wherein at least a component of the radiation has a wavelength suitable so as to photoexcite the quinone;

$R_1R_2CHOH$ is an hydrogen donor alcohol;

$R_1$ and $R_2$, the same or different, are selected from among H and organic substituents (e.g. methyl, ethyl, etc..);

and

AQ and dihydro-AQ may have the same meanings as given above for equations (1) and (2).

Thus, instead of catalytically reducing an anthraquinone compound, as is done in the known AA processes, the corresponding dihydro-anthraquinone compound may be obtained photochemically. The source of the radiation may be artificial (i.e. lamps) or natural (i.e. sunlight). The oxidation of the so obtained dihydro-anthraquinone compound to form $H_2O_2$ and to regenerate the anthraquinone compound would be analogous to the AA process.

A photochemical route for $H_2O_2$ production has a number of advantages over the AA processes: namely, An adjacent $H_2$ generation facility is not needed;

A catalyst is not needed;

Unwanted side reactions are minimized or avoided;

The process can be carried out at ambient or room temperature.

As indicated above, the source of the radiation may be artificial (i.e. lamps). However, if lamps have to be used as the radiation source this could involve a large cost factor not only for the equipment but also for the electrical power needed to drive the lamps. Such electrical power costs could nullify the benefits of the photochemical route.

From an energy standpoint, therefore, if natural solar radiation (i.e. direct sunlight) could be used as the source of radiation, this would make the photochemical production of $H_2O_2$ more attractive. Thus, the preferred radiation source is natural solar radiation.

On the other hand, although the photochemical route has the aforementioned advantages, the use of solar radiation (whether natural or artificial) is hindered by a significant economic factor i.e. the economics of size. If natural solar radiation, for example, is to be used as the source of radiation, it is desirable that the surface area needed for light collection be as small as possible while still having a reactor able to generate a sufficient amount of $H_2O_2$; the larger the surface area needed to support production of sufficient $H_2O_2$, the greater the cost for the production facility itself as well as the cost of the day to day operation thereof.

With the above in mind, if anthraquinone were to be used for photochemical synthesis of $H_2O_2$, a reactor would require a relatively high surface area if sunlight were to be used as the source of solar radiation. For example, using (unsubstituted) anthraquinone for photochemical $H_2O_2$ production would generate approximately 33 kg of $H_2O_2$ per year per square meter ($m^2$) of reactor surface, based on solar irradiance data for Toronto, Canada (K. C. Demerjian, K. C. Schere and J. T. Peterson, Adv. Environ. Sci. Technol. 10, 369 (1980)). This means that a very large surface area for light collection would be needed for the reactor to generate a sufficient amount of $H_2O_2$.

Accordingly, in order to take advantage of the photochemical route and have photochemical production facilities of small size, other photochemically active compounds, capable of producing $H_2O_2$, must be available as alternatives to the anthraquinone compounds (i.e. as alternate compounds for use in the photochemical reduction step).

Thus, it would be advantageous to have a process for the manufacture of $H_2O_2$ which could take advantage of a photochemical route making use of solar energy.

It would be particularly advantageous to have a photochemical process for the production of $H_2O_2$ which could make use of natural solar radiation as the source of electromagnetic radiation.

It would further be advantageous to have available one or more compounds which have a capacity to make effective use of solar radiation for the photochemical production of $H_2O_2$. It would be particularly advantageous to have available one or more compounds that have a capacity to make effective use of natural solar radiation as the source of electromagnetic radiation

SUMMARY OF INVENTION

In accordance with the present invention there is provided a photochemical process for the manufacture of hydrogen peroxide wherein a 9,10-phenanthraquinone compound is exposed, in the presence of an effective amount of a hydrogen donor alcohol, to electromagnetic radiation to photoreduce the 9,10-phenanthraquinone compound to the corresponding dihydrocompound, wherein the dihydro-compound obtained is oxidized to produce hydrogen peroxide and to regenerate the 9,10-phenanthraquinone compound, and characterized in that said 9,10-phenanthraquinone compound is selected from the group of compounds consisting of unsubstituted 9,10-phenanthraquinone and 9,10-phenanthraquinone substituted by one or more members of the class consisting of alkyl groups of 1 to 8 carbon atoms, —$CF_3$, F and —$SO_3$ $M$, $M$ being $H$ or an alkali metal.

The process of the present invention exploits or makes use of unsubstituted 9,10-phenanthraquinone as well as substituted derivatives thereof. Thus, unsubstituted 9,10-phenanthraquinone of formula

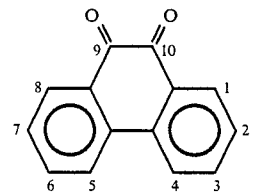

may be used for the photochemical reduction step in the process of the present invention. Substituted derivatives of 9,10-phenanthraquinone may also be used; these are described more fully below. The following are examples of substituted derivatives of 9,10-phenanthraquinone which may similarly find use in the process of the present invention:

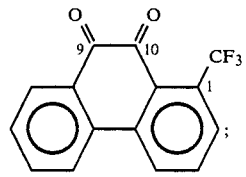

and

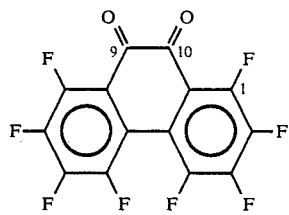

The 9,10-phenanthraquinone compounds, exploited for the process of the present invention, can make effective use of sunlight to generate significant amounts of $H_2O_2$. As indicated above, anthraquinone would generate about 33 kg/$m^2$/yr of $H_2O_2$ based on irradiance data for Toronto, Canada. On the other hand, a 9,10-phenanthraquinone compound such as the —$CF_3$ substituted 9,10-phenanthraquinone of formula

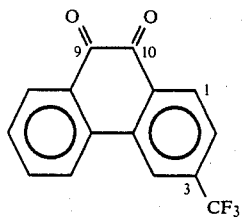

could generate about 150 to 175 kg/m²/yr of $H_2O_2$ based on the same irradiance data.

Although natural solar radiation (i.e. direct sunlight) is preferred as the source of radiation for the present invention, an artificial source could be used, if desired. The phenanthraquinones absorb light at wavelengths falling in the range from about 480 nm and lower, such as from about 200 to about 480 nm, e.g. wavelengths in the ranges of 200 to 290 nm, 290 to 360 nm and 360 to 480 nm.

As indicated above the process of the present invention may exploit unsubstituted 9,10-phenanthraquinone as well as 9,10-phenanthraquinone substituted by one or more members of the group consisting of alkyl groups of 1 to 8 carbon atoms, —$CF_3$, F and —$SO_3M$, M being H or an alkali metal.

In accordance with an aspect of the present invention a 9,10-phenanthraquinone compound may be exploited which is a member of the group of compounds consisting of compounds of general formula

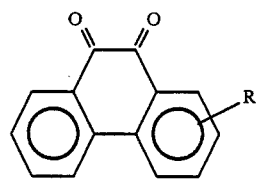

wherein R is a member of the class consisting of H, alkyl groups of 1 to 8 carbon atoms, —$CF_3$, F and —$SO_3M$, M being H, sodium or potassium.

9,10-phenanthraquinone compounds may be obtained commercially or may be prepared by following known preparation procedures, making appropriate adjustments thereto as needed.

9,10-phenanthraquinone compounds may, for example, be prepared by following the method of Mallory and Wood, J. Org. Chem. 29, 3373 (1964) which includes irradiation of the corresponding stilbene.

Alternatively, 9,10-phenanthraquinone compounds may be btained from commercial sources. For example, 9,10-phenanthraquinone of formula

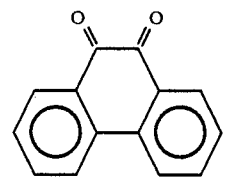

may be obtained from Aldrich Chemical Company.

It has been found that, for good yields of $H_2O_2$, the 9,10-phenanthraquinones should be used in a concentration greater than about $1 \times 10^{-3}$ mol/liter; lower concentrations may, of course, nevertheless, be used, if so desired.

In accordance with the process of the present invention, irradiation of a 9,10-phenanthraquinone compound is carried out in the presence of an hydrogen donor alcohol. Such alcohols are known (e.g. see U.S. Patent no. 4,576,687 and C. F. Wells, NATURE 177, 483 (1956)). Any alcohol which can act as a hydrogen donor is a possible candidate for use. The choice of a suitable alcohol to use will, however, depend on the facts of any particular case. The alcohol should, for example, participate efficiently in the photo-reduction of the 9,10-phenanthraquinone compound with no (or minimal) occurrence of side reactions. The alcohol should provide a by-product aldehyde or ketone which does not inhibit the reactions. The by-product aldehyde or ketone obtained from the alcohol, preferably, should be easily removable from the solution, etc . . . . From a commercial point of view, the by-product aldehyde or ketone, derived from the alcohol, should, preferably, be one that has a ready market.

The hydrogen donor alcohol may be selected from among simple alcohols such as the alkanols. The alcohol may, for example, be an unsubstituted lower alkanol having from 1 to 6 carbon atoms. The alcohol may also be selected from among more complex alcohols such as cycloalkanols, glycols or other polyols etc . . . . As examples of hydrogen donor alcohols, the following may be mentioned: ethanol; isopropanol; 2-butanol; 2-octanol; cyclohexanol; ethylene glycol; etc . . .

Isopropanol is a preferred hydrogen donor alcohol. The carbonyl by-product of this alcohol is acetone which has many uses.

The amount of hydrogen donor alcohol to be present will depend on the choice of 9,10-phenanthraquinone compound, the hydrogen donor alcohol it is desired to use, the solvent system desired, etc . . . The relative amounts of other substances which may be present may also have to be taken into account; however, the volume ratio as between the donor alcohol and the 9,10-phenanthraquinone compound is in general not important as long as the alcohol concentration is above 1 mol/liter. In any event, hydrogen donor alcohol should be used in an amount which will be effective to facilitate the photo-reduction of the 9,10-phenanthraquinone compound on irradiation. In general, the yield of $H_2O_2$ increases as the concentration of alcohol increases with a tendency to level off at higher concentrations. Isopropanol may, for example, be used at concentrations in the range of from 1 to 10 mol per liter.

The irradiation process of the present invention may, if desired, be carried out in any suitable solvent system. The solvent system may, for example, comprise an alcohol. Thus, the alcohol used as solvent may be the same alcohol as is used for the hydrogen donor; the fact that the solvent alcohol will participate in the irradiation reaction is not detrimental. However, apart from the above case, a solvent system should be relatively inert. Solvent systems should be avoided which will unduly participate in undesirable reactions with the excited 9,10-phenanthraquinone compound. For example, systems having abstractable hydrogen should be avoided where the rate of the undesirable reaction with the excited 9,10-phenanthraquinone compound would be unacceptably high.

The solvent system may comprise other organic solvents, such as, for example, benzene, chlorobenzene, o-dichlorobenzene, etc. .

Water may also be used as a solvent. In this case, a water soluble 9,10-phenanthraquinone compound may be used; for example a sulphonated derivative of 9,10-phenanthraquinone.

It has been found that the presence of water, even in a small amount, may have a beneficial effect on product yield. Thus, the solvent system may be an aqueous-organic solvent system which may comprise water and one or more organic solvents such as described above.

One phase or two phase solvent systems may be used. A one phase system may comprise an alcohol and water combination, e. g. isopropanol and water. A two phase system may comprise water and some other organic solvent, e.g. benzene and water; chlorobenzene and water; o-dichlorobenzene and water; etc . . . . The advantage of a two phase system over a one phase system is that $H_2O_2$, may be continuously extracted from the organic solvent via the aqueous phase. The isolation of $H_2O_2$ may thus be easier using a two-phase system.

If a two phase system, for example, is to be used, good results may be obtained using about 6 parts by volume organic solvent, about 3 parts by volume water and about 1 part by volume hydrogen donor alcohol.

Oxygen is not necessary for the photo-reduction step. However, it's presence during this step can be advantageous for the $H_2O_2$ production process as a whole.

If the photo-reduction step is carried out in the presence of oxygen, build-up of the corresponding dihydro-compound can be avoided since the dihydro-compound will be continuously converted back to the 9,10-phenanthraquinone compound with the attendant production of $H_2O_2$. The $H_2O_2$ so obtained may also be recovered continuously (e.g. if a two phase system is used). Using such a process it would not be necessary to stop the reaction, isolate the dihydro-compound and then contact the dihydro-compound with oxygen to give $H_2O_2$. If oxidation is to be carried out during irradiation, it may be accomplished by the bubbling or sparging of $O_2$ gas or an oxygen containing gas such as air through the reaction mixture.

Of course, it is possible to carry out the photo-reduction and oxidation steps separately one after the other. This would involve the use (e.g. sparging ) of an inert (i.e. oxygen free) atmosphere such as nitrogen or argon for the photoreduction step followed by contacting the (isolated) dihydro-compound with oxygen.

The recovery of $H_2O_2$ depends on the solvent system used. I f alcohol or alcohol/water is used then recovery may be accomplished by distillation in known manner. If a two phase solvent system (e.g. benzene/water) is used the $H_2O_2$ may be continuously extracted from the organic solvent into the water. The aqueous solution of $H_2O_2$ can then be distilled as required to obtain the desired $H_2O_2$ concentration.

The carbonyl by-product may also be recovered in known manner. For example, if isopropanol is used as the hydrogen donor alcohol then the carbonyl formed is acetone which is water soluble. Acetone may be recovered in known manner by extraction (if a two-phase solvent system is used) and subsequent concentration by distillation.

As previously mentioned, although artificial (solar) radiation may be used, natural solar radiation (i.e. sunlight) is the preferred source of radiation for the reasons given above.

A process in accordance with the present invention may thus, by way of example only, include:
the use of an hydrogen donor alcohol;
the use of a solvent system; and
the use of natural solar radiation (i.e. direct sunlight) as the source of electromagnetic radiation.

Isopropanol, in particular, may be used as the hydrogen donor alcohol. The irradiation of the 9,10-phenanthraquinone compound may, as desired, be carried out in a suitable solvent system, e.g. in a simple alcohol such as isopropanol, in water in benzene, in chlorobenzene, in o-dichlorobenzene or in a mixture thereof. The irradiation may take place in an aqueous-organic solvent system. The aqueous-organic solvent system may, for example, be selected from the group consisting of:
benzene and water;
chlorobenzene and water;
o-dichlorobenzene and water; and isopropanol and water.

In drawings which illustrate embodiments of the invention FIG. 1 is a graphic representation of $H_2O_2$ yield as a function of the amount of test compound.

Reference will now be made, by way of illustration only, to a number of tests. For the tests referred to in Tables 2, 3, 4 and 5 below as well as for the graph illustrated in FIG. 1, the irradiation evaluations were, unless otherwise indicated, generally carried out as follows:

(i) For ease of control the irradiation tests were carried out using a 40 watt Vita-lite (reg. trademark) lamp which closely simulated sunlight; the lamp was obtained from DuroTest Electric Ltd., Rexdale, Ontario, Canada. The lamp was disposed at one focus of a mirrored elliptical reactor having a focal length of 10 inches and an eccentricity of 0.555. The reactor was essentially enclosed and was constructed of reflective aluminum, the inner surface thereof being mirrored. The reactor was adapted to receive a 5 cm x 20 cm cylindrical pyrex reaction vessel at it's other focus. The reaction vessel was also equipped with gas bubbler means to allow for the addition of a gas such air, oxygen, etc . . . during irradiation.

(ii) The compound to be evaluated for $H_2O_2$ production was admixed with an organic solvent, in the presence of an hydrogen donor alcohol, and water was added thereafter.

(iii) The test mixture was irradiated in an above described reaction vessel disposed as indicated above, namely at the other focus of the reactor.

(iv) The irradiation tests were carried out at ambient temperature and pH.

(v) The test mixture was stirred with a magnetic stirrer. Air or oxygen was also bubbled through the test mixture during irradiation.

(vi) After irradiation for the selected length of time (one hour or more as the case may be), an $H_2O_2$ containing aliquot was withdrawn for analysis. The $H_2O_2$ analysis method involved titration by ceric sulphate (A.I. Vogel, "A Textbook of Quantitative Inorganic Analysis Including Elementary Instrumental Analysis" John Wiley & Sons, Toronto, p. 324 (1961)). Typically 0.5 ml of 0.002 mol/litre iron (II) o-phenanthroline solution was added to a 1 ml $H_2O_2$ containing aliquot and the mixture was titrated with $2 \times 10^{-3}$ mol/liter ceric sulphate in 0.1 N $H_2SO_4$ to a blue endpoint. The existence of $H_2O_2$ as the oxidizing agent was confirmed by detection using the hydrogen peroxide specific enzyme C-40 catalase.

In the Tables 1, 2, 3, 4 and 5 below as well as for the graphs in FIG. 1 the compound designations using the letter A refer to anthraquinone compounds while the compound designations using the letter P refer to 9,10-phenanthraquinone compounds in accordance with the present invention.

For the purposes of the tables PRODUCTION RATE is defined as the moles of $H_2O_2$ produced per mole of catalyst added (i.e. starting amount) for an hour of irradiation time.

TABLE 1

Corresponding compound formulae for the Compound designations referred to in Tables 2 to 5 and FIG. 1

| compound designation | test compound formula |
|---|---|
| A1 | 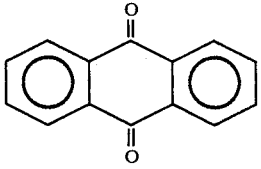 |
| A2 | 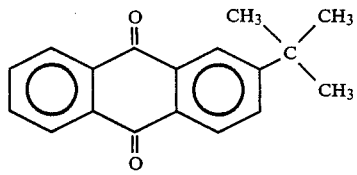 |
| A3 | 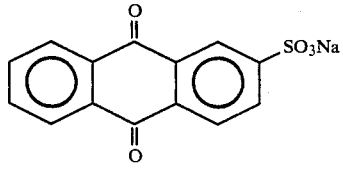 |
| P1 | 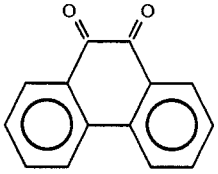 |
| P2 | 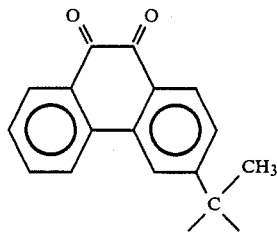 |
| P3 | 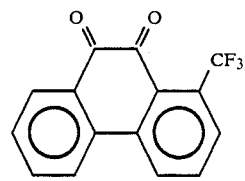 |// cont.

TABLE 1-continued

Corresponding compound formulae for the Compound designations referred to in Tables 2 to 5 and FIG. 1

| compound designation | test compound formula |
|---|---|
| P4 | 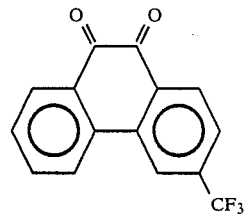 |
| P5 | 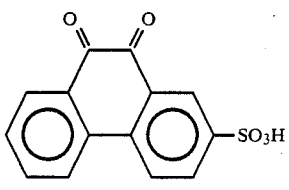 |
| P6 | 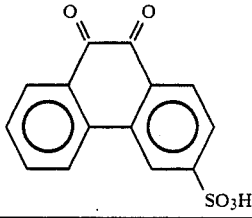 |

The reactions reported in Table 2 below were conducted using $5\times10^{-5}$ moles of test compound in a system comprising 100 ml of isopropanol and 20 ml water with bubbling of air or $O_2$, as the case may be, at a rate of 50 ml/min . The irradiation was conducted for one hour; the production rate thus being with reference to this one hour period.

TABLE 2

Production Rates in Isopropanol/water

| Compound | Bubbled Gas | Production Rate |
|---|---|---|
| A1 | AIR | 1.3 |
| A2 | AIR | 1.8 |
| A2 | $O_2$ | 1.8 |
| A3 | AIR | 1.6 |
| P1 | AIR | 5.5 |
| P3 | AIR | 6.4 |
| P4 | AIR | 6.1 |
| P5 | AIR | 4.3 |
| P6 | AIR | 7.2 |

The reactions reported in Table 3 were conducted using $5\times10^{-5}$ moles of test compound in a system comprising 100 ml of benzene, 20 ml of isopropanol and 50 ml of water, with bubbling of air or $O_2$ as the case may be, at a rate of 50 ml/min. . The irradiation was conducted for one hour.

TABLE 3

Production Rates in Benzene/water

| Compound | Bubbled Gas | Production Rate |
|---|---|---|
| A2 | AIR | 0.5 |
| A2 | $O_2$ | 0.6 |
| A2 | AIR(a) | 1.0 |
| P1 | AIR | 5.1 |
| P1 | $O_2$ | 4.8 |
| P1 | 92% $N_2$, 8% $O_2$ | 4.9 |

TABLE 3-continued

| Compound | Bubbled Gas | Production Rate |
|---|---|---|
| P2 | $O_2$ | 4.0 |
| P3 | $O_2$ | 3.5 |
| P4 | AIR | 4.4 |

(a)o-dichlorobenzene was used in place of benzene

As can be seen from Tables 2 and 3 above, the production rate using a 9,10-phenanthraquinone compound is several times greater than that for an anthraquinone such as alkyl-anthraquinone. Accordingly, the surface area requirements for a solar reactor using a 9,10-phenanthraquinone compound would be correspondingly smaller than for one using an alkyl-anthraquinone. A solar reactor using a 9,10-phenanthraquinone compound is thus more economically attractive than one using an alkyl-anthraquinone for example.

FIG. 1 graphically illustrates $H_2O_2$ yield as a function of the amount of test compound. The test compounds included an anthraquinone compound as well as a number of different 9,10phenanthraquinone compounds; the graph line for each compound is referred to by compound designation as set out in Table 1 above. The tests were conducted using the desired amount of test compound (for example, compound P1) in a solution system comprising 100 ml of isopropanol and 20 ml water with bubbling of air or $O_2$, as the case may be, at a rate of 50 ml/min. The irradiation tests were each conducted for one hour; i.e. yield being production after one hour irradiation.

The results reported in Table 4 below, were obtained by taking the maximum $H_2O_2$ yield obtainable from the plots in FIG. 1 and dividing each of these values by the value obtained for compound P1, i.e. using compound P1 as the reference.

TABLE 4

| Compound | Relative efficiency |
|---|---|
| A2 | 0.37 |
| P1 | 1.0 |
| P2 | 0.8* |
| P3 | 1.6 |
| P4 | 1.5 |
| P5 | 0.6 |
| P6 | 1.1* |

*the values for compounds P2 and P6 were obtained using results not illustrated in FIG. 1.

The reactions reported in Table 5 below, were conducted using $5.7 \times 10^{-5}$ moles of compound P1 (see Table 1 above for definition of compound P1) in a system comprising 100 ml of benzene, 20 ml of isopropanol and 50 ml of water, with bubbling of 02 at a rate of 30 ml/min. The irradiation time period was as specified in Table 5.

TABLE 5

| Time (hours) | Production rate |
|---|---|
| 2 | 4.8 |
| 4 | 4.9 |
| 6 | 4.9 |

As can be seen from table 5 above, the system produced $H_2O_2$ at about the same rate for up to six hours. In a similar test using air instead of $O_2$, the production rate was the same after 16 hours of irradiation. There was an initial loss of about 20% of the 9,10-phenanthraquinone whereafter the system stabilized for an extended period of time. After about 22 hours of irradiation the production rate dropped off due to decomposition of the 9,10-phenanthraquinone compound.

From the above it can be seen that 9,10-phenanthraquinone compounds can make effective use of sunlight to generate significant amounts of $H_2O_2$ In particular, while anthraquinone would generate about 33 kg/m²/yr of $H_2O_2$, a 9,10-phenanthraquinone compound such as compound P4 (see Table 1 above for definition of compound P4) would generate about 150 to 175 kg/m²/yr of $H_2O_2$ based on the same irradiance data for Toronto, Canada.

Following the irradiation procedure outlined generally above, other atmospheres such as argon and nitrogen (i.e. inert) were tested by being bubbled through test mixtures. In these cases a two stage process was followed which involved irradiating under nitrogen or argon for a length of time, then admitting oxygen to form $H_2O_2$ and reform the 9,10-phenanthraquinone compound. It was found that the production rates were similar to those when bubbling an oxygen containing gas.

A method of preparing a 9,10-phenanthraquinone compound is described in the following example :

PREPARATION of
3-trifluoromethylphenanthraquinone

Step 1: Preparation of substituted stilbene (from H. Adkins & W. Zartman, Org. Syn. Coll. Vol. 2, 606)

1.4 g of Mg turnings were placed in a 3-neck flask equipped with a dropping funnel, condenser and drying tube and heated to remove moisture. The flask was cooled and 15 ml anhydrous ether and a crystal of $I_2$ were added followed by dropwise addition of.7.2 g benzyl chloride in 15 ml ether and the mixture was refluxed 1.5 hours. 10 g trifluoromethyl-p-tolualdehyde in 20 ml ether was added dropwise, refluxed 1 hour and left overnight. The mixture was poured onto 25 g ice and 30 ml cold 20% $H_2SO_4$ was added slowly. After all of the magnesium had dissolved, the ether layer was separated and the aqueous phase was extracted with ether. The ether phase was dried and concentrated and then 40 ml of 50% sulphuric acid was added and the mixture was extracted with dichloromethane, dried and concentrated. The resulting solid was crystallized from methanol to give 4.85 g of 3-trifluoromethylstilbene (m.p. 127° to 129 ° C.).

Step 2: Irradiation to the phenanthrene (from C. S. Wood and F. B. Mallory, J. Org. Chem. 29, 3373 (1964)).

1.1 g of ifluoromethylstilbene and 0.06 g of iodine were dissolved in 800 ml of hexane and irradiated 3 hours with a 450 watt Hanovia lamp in a quartz immersion well with oxygen bubbled through the mixture. The solution was then concentrated to give a yellow liquid which solidified on cooling. Chromatography on silica gel using 10% ethyl acetate in hexane as eluent gave 1.2 g of crude product.

Step 3: Oxidation to the Phenanthraquinone (from C. S. Wood and F. B. Mallory, J. Org. Chem 29, 3373 (1964)).

1.2 g of 3-trifluoromethylphenanthrene was dissolved in 50 ml boiling acetic acid . $CrO_3$ (2.2 g in 2 ml water and 8 ml acetic acid) was added dropwise, refluxed for one hour and poured into 100 ml of cold water. The resulting yellow solid was filtered, washed with hot water, dilute sodium hydroxide and then cold water and recrystallized from toluene/isooctane to give deep yellow-orange needles of 3-trifluoromethylphenanthraquinone (0.35g), m.p. 226° to 227 ° C. ( IR(nujol): 1700(s,C=O), 1610(m), 1350(m), 1310(m),1290(s) ).

Phenanthrene sulphonates may be prepared following the method of L. F. Fieser in Org. Syn. 16. 63 (1936). The corresponding phenanthraquinones may be prepared by $CrO_3$ oxidation using the method outlined above.

Other 9,10-phenanthraquinone derivatives may be prepared in analogous manner. For example, compound P3 may be obtained following the above procedure except that trifluoromethyl-o-tolualdehyde is used as a starting material. The thus obtained compound P3 had a m.p. 180 °to 181 ° C. The obtained (crude) compound P2 had a m.p. 181 °to 183 ° C; the obtained compounds P5 and P6 decomposed on heating.

THE EMBODIMENTS OF THE PRESENT INVENTION IN WHICH AN EXCLUSIVE PROPERY OR PRIVILEGE IS CLAIMED IS AS FOLLOWS:

1. A photochemical process for the manufacture of hydrogen peroxide
   wherein a 9,10-phenanthraquinone compound is exposed, in the presence of an effective amount of an hydrogen donor alcohol, to electromagnetic radiation to photoreduce the 9,10-phenanthraquinone compound to the corresponding dihydrocompound,
   wherein the dihydro-compound obtained is oxidized to produce hydrogen peroxide and to regenerate the 9,10-phenanthraquinone compound, and
   characterised in that said 9,10-phenanthraquinone compound is a member of the group of compounds consisting of unsubstituted 9,10-phenanthraquinone and 9,10-phenanthraquinone substituted by one or more members of the class consisting of alkyl groups of 1 to 8 carbon atoms, $-CF_3$, F and $-SO_3M$, M being H or an alkali metal.

2. A process for the manufacture of hydrogen peroxide as defined in claim 1 wherein said 9,10-phenanthraquinone compound is a member of the group of compounds consisting of compounds of general formula

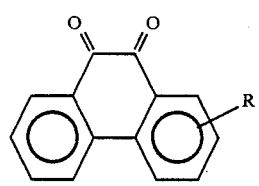

wherein R is a member of the class consisting of H, alkyl groups of 1 to 8 carbon atoms, $-CF_3$, F and $-SO_3M$, M being H, sodium or potassium.

3. A process for the manufacture of hydrogen peroxide as defined in claim 1 wherein said 9,10-phenanthraquinone compound is unsubstituted 9,10-phenanthraquinone of formula

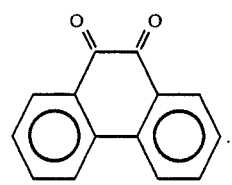

4. A process for the manufacture of hydrogen peroxide as defined in claim 1 wherein said 9,10-phenanthraquinone compound is a $-CF_3$ substituted 9,10-phenanthraquinone of formula

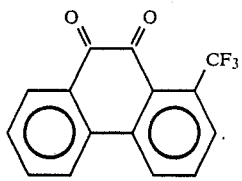

5. A process for the manufacture of hydrogen peroxide as defined in claim 1 wherein said 9,10-phenanthraquinone compound is a $-CF_3$ substituted 9,10-phenanthraquinone of formula

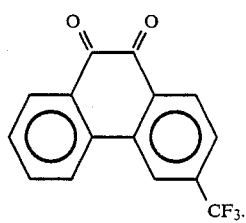

6. A process for the manufacture of hydrogen peroxide as defined in claim 1 wherein said 9,10-phenanthraquinone compound is a $-CF_3$ substituted 9,10-phenanthraquinone of formula

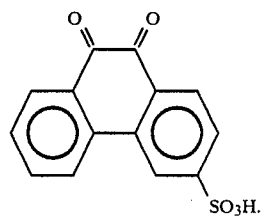

7. A process for the manufacture of hydrogen peroxide as defined in claim 1 wherein said hydrogen donor alcohol is a member of the class consisting of ethanol, isopropanol, 2-butanol, 2-octanol, cyclohexanol and ethylene glycol.

8. A process for the manufacture of hydrogen peroxide as defined in claim 1 wherein said hydrogen donor alcohol is isopropanol.

9. A process for the manufacture of hydrogen peroxide as defined in claim 1 wherein said 9,10-phenanthraquinone compound is exposed to solar radiation in an aqueous-organic solvent system.

10. A process for the manufacture of hydrogen peroxide as defined in claim 9 wherein said aqueous-organic solvent system is selected from the group consisting of
    benzene and water;
    chlorobenzene and water;
    o-dichlorobenzene and water; and isopropanol and water.

11. A process for the manufacture of hydrogen peroxide as defined in claim 2 characterised in that natural solar radiation is the source of said radiation.

12. A process for the manufacture of hydrogen peroxide as defined in claim 3 characterised in that natural solar radiation is the source of said radiation.

13. A process for the manufacture of hydrogen peroxide as defined in claim 4 characterised in that natural solar radiation is the source of said radiation.

14. A process for the manufacture of hydrogen peroxide as defined in claim 5 characterised in that natural solar radiation is the source of said radiation.

15. A process for the manufacture of hydrogen peroxide as defined in claim 6 characterised in that natural solar radiation is the source of said radiation.

16. A process for the manufacture of hydrogen peroxide as defined in claim 11 wherein said hydrogen donor alcohol is a member of the class consisting of ethanol, isopropanol, 2-butanol, 2-octanol, cyclohexanol and ethyl glycol.

17. A process for the manufacture of hydrogen peroxide as defined in claim 11 wherein said hydrogen donor alcohol is isopropanol.

18. A process for the manufacture of hydrogen peroxide as defined in claim 11 wherein said 9,10-phenanthraquinone compound is exposed to said solar radiation in an aqueous-organic solvent system.

19. A process for the manufacture of hydrogen peroxide as defined in claim 17 wherein said 9,10-phenanthraquinone compound is exposed to said radiation in an aqueous-organic solvent system, said aqueous-organic solvent system being selected from the group consisting of
benzene and water; and
isopropanol and water.

20. A process for the manufacture of hydrogen peroxide as defined in claim 19 wherein said 9,10-phenanthraquinone compound is unsubstituted 9,10-phenanthraquinone of formula

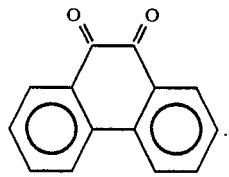

21. A process for the manufacture of hydrogen peroxide as defined in claim 19 wherein said 9,10-phenanthraquinone compound is a —$CF_3$ substituted 9,10-phenanthraquinone of formula

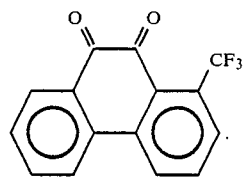

22. A process for the manufacture of hydrogen peroxide as defined in claim 19 wherein said 9,10-phenanthraquinone compound is a —$CF_3$ substituted 9,10-phenanthraquinone of formula

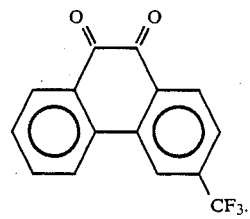

23. A process for the manufacture of hydrogen peroxide as defined in claim 19 wherein said 9,10-phenanthraquinone compound is a —$SO_3H$ substituted 9,10-phenanthraquinone of formula

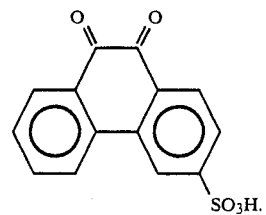

* * * * *